United States Patent [19]

Ahn et al.

[11] 4,447,405

[45] May 8, 1984

[54] REMOVAL OF BROMIDES FROM ARSENIC ACID SOLUTION

[75] Inventors: Byung K. Ahn, Pittsburgh; Kenneth A. Morris, Irwin, both of Pa.

[73] Assignee: Koppers Company, Inc., Pittsburgh, Pa.

[21] Appl. No.: 411,817

[22] Filed: Aug. 26, 1982

[51] Int. Cl.$^3$ ............................................. C01B 29/00
[52] U.S. Cl. ...................................... 423/88; 423/500; 423/502; 423/617; 210/759; 210/760; 204/103
[58] Field of Search ................. 423/88, 500, 502, 617; 210/759, 760; 204/103

[56] References Cited

U.S. PATENT DOCUMENTS

| | | | |
|---|---|---|---|
| 1,125,086 | 1/1915 | Fuller | 204/86 |
| 1,974,747 | 9/1934 | Latimer | 423/617 |
| 3,044,862 | 7/1962 | Paul . | |
| 3,179,498 | 12/1963 | Harding et al. | 423/502 |
| 4,372,828 | 2/1983 | Ahn | 204/103 |

FOREIGN PATENT DOCUMENTS

| | | | |
|---|---|---|---|
| 2450731 | 4/1976 | Fed. Rep. of Germany | 210/760 |
| 510430 | 7/1976 | U.S.S.R. | 423/617 |

*Primary Examiner*—Edward J. Meros
*Assistant Examiner*—Jackson Leeds
*Attorney, Agent, or Firm*—Donald M. Mac Kay; Herbert J. Zeh, Jr.

[57] ABSTRACT

Bromide ions when used as the redox intermediates in the oxidation of arsenic (III) oxide to arsenic (V) acid can be removed from a solution having a major proportion of arsenic acid by treatment with an oxidant selected from $H_2O_2$, $O_3$ or Cr(VI) to oxidize the bromide to bromine followed by purging with air, nitrogen or other inert gas to sweep out the resultant bromine. The bromine can be recovered and recycled to a fresh batch of arsenic (III) oxide.

10 Claims, No Drawings

REMOVAL OF BROMIDES FROM ARSENIC ACID SOLUTION

BACKGROUND OF THE INVENTION

Electrochemical synthesis of chemicals offers many advantages over conventional methods (e.g., in product purity, effluent control and process simplicity) but certain problems frequently offset these advantages. One problem common to several electrosynthetic processes is that of electrode deactivation or poisoning. A case in point occurs in the anodic oxidation of arsenic (III) oxide to arsenic (V) acid. Within seconds of applying a given potential to the anode (oxidation electrode), the current density typically drops to a few percent of its initial value. Similarly, under constant current conditions, the anode potential rises rapidly and most of the current is consumed by side reactions (mainly $O_2$ evolution).

Electrode deactivation can be avoided by conducting the electrolysis in the presence of a catalytic amount of a halide. However, the removal of the halide remaining in the product solution is a problem. One may consider using an ion exchange resin technique or electrochemical oxidation of halide to halogen. If one uses an ion exchange resin, the desired product is removed with the halide. Electrochemical oxidation of halide to halogen has the disadvantage that the current density and efficiency are reduced as the halide conversion proceeds.

SUMMARY OF THE INVENTION

It has now been discovered that if bromide ions are used as the redox intermediates in the oxidation of arsenic (III) oxide to arsenic (V) acid, said bromide can be removed from a solution having a major proportion of arsenic acid by treatment with an oxidant selected from hydrogen peroxide, ozone or Cr(VI) to oxidize the bromide to bromine followed by a purge of air, nitrogen or other inert gas to sweep out the resultant bromine which can be recovered and recycled to treat fresh arsenic oxide.

DETAILED DESCRIPTION OF THE INVENTION

Employing one of the three oxidants $H_2O_2$, $O_3$ or Cr(VI) at from 100 to 125% of the stoichiometric amount required to oxidize the residual $As^{3+}$ and $Br^-$, a solution of from 30 to 70% arsenic acid at a temperature between room temperature (30° C.) and 70° C. and an initial concentration of HBr of from 0.1 to 2.0 M, preferably 0.5 to 1.0 M, the bromide was converted to elemental bromine and the bromine removed by sparging with air or nitrogen. The results are shown in the following Table I wherein it can be seen that the bromide is essentially removed.

TABLE I

| Oxidant Used | | Solution Treated | | |
|---|---|---|---|---|
| Kind | % Stoichiometry | % $H_3AsO_4$ | Molar HBr (initial-final) | Treating Conditions |
| $H_2O_2$ | 75 | @30 | 0.5-0.16 | Mix, stir at |
| | 100 | @30 | 0.5-0.06 | 30-60° C. for |
| | 100 | @70 | 0.8-0.10 | one to several |
| | 110 | @30 | 0.5-0.03 | hours with N2 or |
| | 110 | @70 | 0.8-0.001 | air sparging. |
| | 125 | @30 | 0.5-0.00 | |
| $O_3$ | —* | @70 | 0.95-0.61 | after one hour, 25° C. |
| | | @70 | 0.95-0.00 | after two hours, 25° C. |
| Cr(VI) | 100 | @70 | 1.00-0.03 | ½ hour, 30-70° C. |

[*about 100% stoichiometry]

If Cr(VI) is employed as the oxidant, it is reduced to Cr(III) which must be removed by other means. Consequently, hydrogen peroxide and ozone are preferred because they do not leave any impurity in the solution.

Since bromine can catalyze the decomposition of hydrogen peroxide and can itself be reduced to bromide by hydrogen peroxide, the removal efficiency may be improved by preventing a buildup of bromine through such steps as controlled addition of hydrogen peroxide with simultaneous removal of bromine.

Ion exchange resins are not suitable to remove bromide because As(V) acid also exists as an anion so that a suitable anion exchange resin must selectively exchange with bromide in the presence of As(V) ions.

Various carbon materials to include activated carbon, activated coconut charcoal and graphite powder were also found unsuitable to remove bromide.

In the following Table II, data is given for bromine removal. The test solution was maintained at a temperature of between 25° and 85° C. and contained 3 M $As_2O_3$ (ca. 30%), 0.5 N bromine (i.e., 0.25 M $Br_2$) and 0.25 M HBr. The solution was sparged with nitrogen or air and water vapor was refluxed back to the container. Bromine vapor carried out was recovered in NaOH or As(III) oxide solution in water as bromide. The results for effects of temperature, purging medium and recovery medium are tabulated below.

TABLE II

| Product Solution | | Recovery Solution | | Time Duration | % |
|---|---|---|---|---|---|
| Temp. (°C.) | Purging Medium | Temp. (°C.) | Type | for 100% Removal | Recovery |
| 25 | nitrogen | 25 | 30 g/l $As_2O_3$ | 2-3 hours | 91-95 |
| 50 | nitrogen | 25 | 30 g/l $As_2O_3$ | 1 | 84-91 |
| 80-85 | nitrogen | 25 | 30 g/l $As_2O_3$ | ½ | 77-83 |
| 30 | nitrogen | 25 | 5% NaOH | 2 | — |
| 80 | nitrogen | 25 | 5% NaOH | ½ | 100 |
| 50 | nitrogen | 25 | 5% NaOH | ½ | 82 |
| 50 | air | 25 | 5% NaOH | ⅔ | 75 |
| 50 | air | 25 | 30 g/l $As_2O_3$ | 1⅓ | — |
| 50 | air | 50 | 30 g/l $As_2O_3$ | 1 | 80-90 |

From the data, it can be seen that solutions of NaOH and As(III) oxide were equally effective as recovery media. No difference was found between nitrogen and air as the purging medium. At higher temperatures the bromine was removed more rapidly. Preferably the temperature is maintained at bromine's boiling point in water of 54° C. or higher.

While the above description and examples are illustrative of the invention, obvious modifications and variations will be apparent to one of ordinary skill in the art. Accordingly, the invention is intended to be limited only by the appended claims.

What is claimed is:

1. A method for removing bromide from a solution containing same and a major proportion of $H_3AsO_4$ which comprises contacting said solution with an oxidant selected from $H_2O_2$, $O_3$ or Cr(VI) to convert bromide to bromine, and subjecting the resultant solution to a purge of air or inert gas to remove said bromine.

2. The method of claim 1 wherein the solution contains minor amounts of $As_2O_3$.

3. The method of claim 1 wherein the oxidant is $H_2O_2$.

4. The method of claim 1 wherein the oxidant is $O_3$.

5. The method of claim 1 wherein the oxidant is Cr(VI).

6. The method of claim 1 wherein the oxidant is employed in an amount of from about 100 to 125% of stoichiometry.

7. The method of claim 1 wherein the purge is air.

8. The method of claim 1 wherein the purge is nitrogen.

9. The method of claim 1 wherein the bromide solution is maintained at a temperature between about 25° and 85° C.

10. The method of claim 1 wherein the bromine solution is maintained at a temperature of at least 54° C. at atmospheric pressure.

* * * * *